United States Patent [19]
Lapeyre

[11] 3,975,490
[45] Aug. 17, 1976

[54] METHOD OF MOLDING A REINFORCED TIRE FROM TWO PREFORMED SECTIONS

[75] Inventor: James M. Lapeyre, New Orleans, La.

[73] Assignee: The Laitram Corporation, New Orleans, La.

[22] Filed: June 28, 1973

[21] Appl. No.: 374,552

Related U.S. Application Data

[62] Division of Ser. No. 144,585, May 18, 1971.

[52] U.S. Cl................ 264/250; 264/248; 264/271; 264/326; 264/330; 264/347; 264/DIG. 59; 156/245; 156/304; 156/306
[51] Int. Cl.²............. B29H 5/02; B29H 17/00
[58] Field of Search............ 264/248, 249, 315, 326, 264/250, 263, 271, DIG. 59, 330, 347; 156/242, 125, 304, 132, 96, 306, 245

[56] References Cited
UNITED STATES PATENTS

| | | | |
|---|---|---|---|
| 1,732,793 | 10/1929 | Darrow | 156/132 |
| 2,497,226 | 2/1950 | McNeill | 264/326 |
| 2,609,026 | 9/1952 | Luchsinger-Cabellero | 156/96 |
| 2,925,623 | 2/1960 | Beckadolph | 264/277 |
| 3,218,209 | 11/1965 | Travers et al. | 156/123 |
| 3,427,213 | 2/1969 | Alderfer | 264/248 |
| 3,472,715 | 10/1969 | Weinbrenner et al. | 264/326 |

*Primary Examiner*—Willard E. Hoag
*Attorney, Agent, or Firm*—Schiller & Pandiscio

[57] ABSTRACT

Method of making a reinforced pneumatic tire in which the tire body is formed in at least two sections each including a side wall and a plurality of annular bands each including an annular reinforcing belt embedded in an elastomer. The tire sections are assembled in a mold with the annular bands of each section interleaved with the annular bands of another section and the elastomer is cured to form an integral tire body. The tire may be formed of two reinforced sections with the interleaved bands forming the annular tread section of the tires, or as three reinforced sections, including two sections each including a side wall and annular bands and a connecting section including annular bands with reinforcing belts which are interleaved with the annular bands of the other two sections to form a tread section. An annular, elastomeric tread section may be formed separately and bonded around and to the annular bands of the reinforced sections.

14 Claims, 7 Drawing Figures

METHOD OF MOLDING A REINFORCED TIRE FROM TWO PREFORMED SECTIONS

This application is a division of my copending application Ser. No. 144,585, filed May 18, 1971 for Reinforced Tire and Method of Manufacturing Same.

The present invention is concerned with reinforced, pneumatic tire bodies and their manufacture, and particularly with a novel and improved method of manufacturing a tire body by joining a plurality of preformed sections.

A number of proposals have been made (See for example, U.S. Pat. Nos. 2,497,226, 3,427,213, and 3,458,373.) for producing pneumatic tire bodies by forming the tire as two halves each including a side wall and a portion of the annular tread section and joining the two tire halves to one another. One purpose in forming the tire this way is to avoid the laborious task of wrapping multiple plies, belts and/or cords of reinforcing fibers impregnated with an elastomer around a tire building drum, removing the tire band thus formed from the drum and reshaping it into the toroidal form of the finished tire. As is pointed out in the prior art, not only are conventional tire forming processes of this type expensive, requiring both expensive machinery and highly skilled manual labor, but all too frequently, the forming process results in distortion, bunching, stretching and/or kinking of reinforcing materials resulting in a weakened or unusable tire. A major problem encountered in forming a tire in two sections is that of securely joining the sections to one another. Previous manufacturing methods of this type have been unable to produce a tire with a reinforcing structure having the structural integrity of tires produced by conventional methods.

An object of the present invention is to provide a novel, improved and less expensive method of manufacturing a pneumatic tire in two or more sections and joining the sections to one another in such a way as to produce a strong, integral tire structure.

Another object of the invention is to provide a method as described in which each tire section includes a plurality of annular bands having the reinforcing materials embedded therein and said bands are interleaved and bonded to one another so that there is overlapping of the reinforcing materials of the sections.

A further object of the invention is to provide a method as described in which the tire is formed of three sections including two substantially identical side sections and a medial connecting section all including interleaved, overlapping, annular, reinforced bands.

Other objects of the invention will in part be obvious and will in part appear hereinafter.

The invention accordingly comprises the method involving the several steps and the relation and order of one or more of such steps with respect to each of the others, and the product possessing the features, properties and the relation of components which are exemplified in the following detailed disclosure, and the scope of the application of which will be indicated in the claims.

For a fuller understanding of the nature and objects of the invention, reference should be had to the following detailed description taken in connection with the accompanying drawings wherein.

Figure 1:
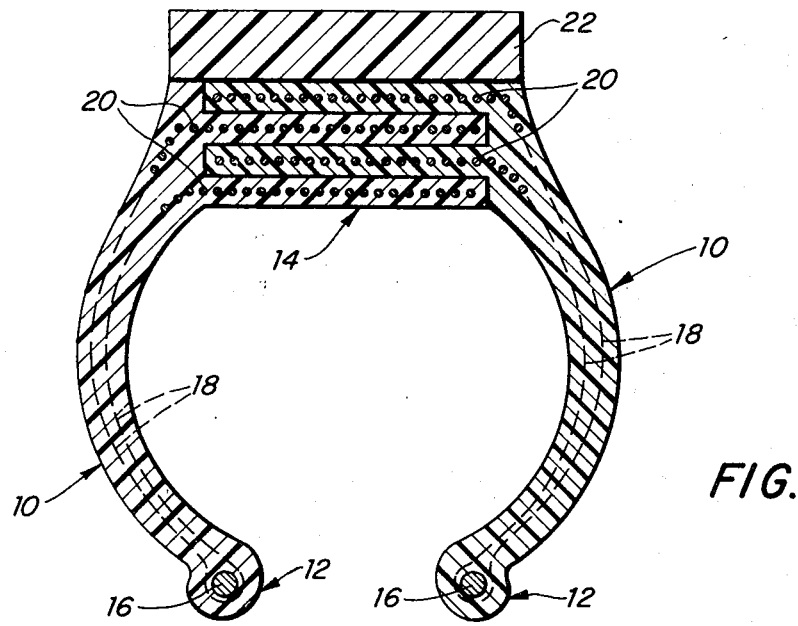
FIG. 1 is a sectional view through a pneumatic tire formed in accordance with the method of the invention by joining at least two preformed, reinforced sections.

Reference is now made to FIG. 1 of the drawings wherein there is illustrated a pneumatic tire manufactured in accordance with the invention. The tire shown is typical of pneumatic tires currently in use and has a generally toroidal configuration, with a cross sectional configuration resembling a horseshoe. The tire generally comprises two side walls designated 10, each having a curved configuration and extending radially outward from a reinforced inner circular rim or bead portion 12 for engaging the flange of a rim or wheel on which the tire is mounted. The two side walls 10 are joined by an annular, transverse or tread section 14 providing the support for the encircling annular tread. The tire body is formed of cured or vulcanized elastomer such as a natural or synthetic rubber, or polymer such as polyurethane, in which is embedded a number of reinforcing components in the form of fibers, cords, woven and knitted fabrics and/or wires, formed of a variety of materials including metal, inorganic fibers such as glass and both natural and synthetic organic fibers such as cotton, rayon and nylon.

In a typical tire body such as shown, the reinforcing components include a stranded wire ring or grommet 16 embedded in each of bead portions 12. The side walls 10 are usually reinforced with a fabric 18 which can be woven or knitted, the former being preferred and its use being substantially simplified by the method of the invention. The fabric is preferably loosely woven (or knitted) to facilitate its impregnation with and embedment in the elastomer and may take the form of a continuous sleeve and/or helically or radially wound, overlapping bands which may extend from rim section 12, where they may be wrapped around ring 16, throughout the side walls 10. Endless annular reinforcing belts 20, also formed of a woven fabric, are embedded in annular section 12 underlying the elastomer in which the tread is formed.

The usual method of forming a tire casing involves first, weaving and/or knitting the fiber reinforcing components which usually take the form of inextensible belts or strips in the case of woven fabrics, and bidirectionally deformable knitted sleeves or rings. The basic reinforcing fabrics are then impregnated and/or coated with an elastomer which is hardened as by freezing or partial curing sufficiently to permit assembly, winding, etc. of the elastomer impregnated reinforcing fabrics into a reinforcing structure. As will be noted, the shape and form of this reinforcing structure is very complex so that its fabrication, assembly and shaping represent the most difficult, costly, and time and labor consuming part of the tire manufacturing process as well as the most critical part of the process because the strength, integrity and performance of the tire are dependent upon the reinforcing structure.

The manufacturing method of the invention makes possible the assembly and shaping of this reinforcing structure by methods that are substantially less expensive than conventional methods currently in use. It requires little or no hand labor and can be performed by automatic machinery to produce a more uniform and higher quality product. Forming the reinforcing structure in two or more sections eliminates the necessity for substantially altering the configuration of a preformed reinforcing structure when placing it in the mold in which the tire is formed and cured, a particularly difficult procedure during which most tire defects occur. The manufacturing method of the invention also provides the very important added advantage of stronger bonding or joinder of the preformed reinforcing structure into an integral whole which has the structural integrity found, heretofore, only in tires formed by conventional methods.

Figure 2:
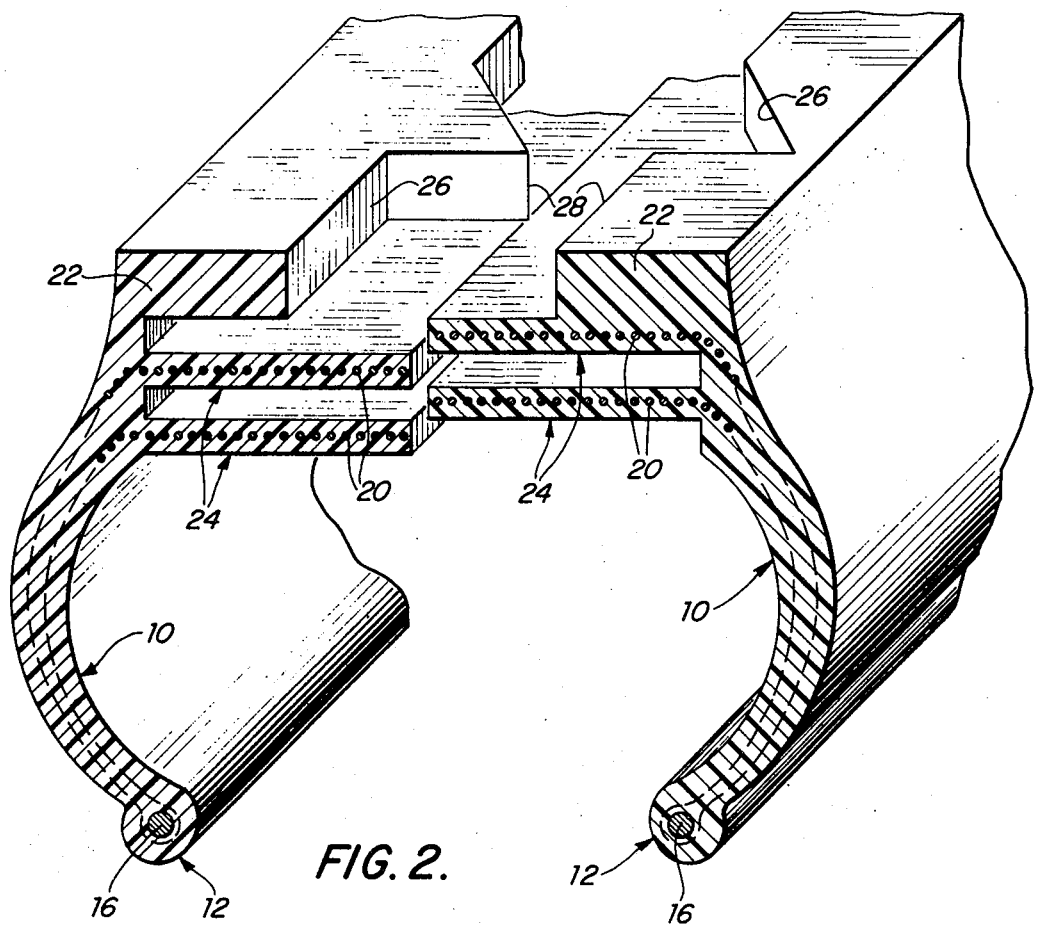
FIG. 2 is a fragmentary perspective, sectional view of a modified embodiment of the tire of FIG. 1, illustrating the method of manufacturing the tire in two preformed sections.

The tires shown in FIGS. 1 and 2 each comprise two reinforced sections fabricated of a elastomer-impregnated, reinforcing elements and premolded prior to assembly with one another. The tire of FIG. 1 is a three-section tire including two, premolded reinforced sections including the side walls, an annular tread-supporting section 14 and an annular tread portion 22 formed as a separate ring or annulus of an elastomer, engaged around and united with annular section 14. The treads are formed in tread portion 22 either during or subsequent to the final molding and curing operation in which the tire sections are joined. The two reinforced sections shown separately in FIG. 2, each comprise a side wall 10, a bead or rim section 12 and at least a pair of annular bands 24 each preferably including a belt 20. Each of bands 24 has an axial dimension slightly less than annular section 14 and the bands of each section are of equal thickness and spacing to permit interleaving as shown in FIG. 1.

The tire of FIG. 2 is illustrated as being formed in two sections each including a part of annular tread portion 22 formed on the other band 24 of one tire section and spaced from the outer band of the other section to permit the band of the first section to be sandwiched therebetween. The relatively thick layers of elastomer comprising the two parts of thread portion 22, are formed with edges adapted to abut with one another. To provide a stronger and more integral structure, each of these edges is formed with mutually engageable indentations 26 and projections 28 which function as keys while increasing the length of the surfaces at which the edges are united.

Figure 3:
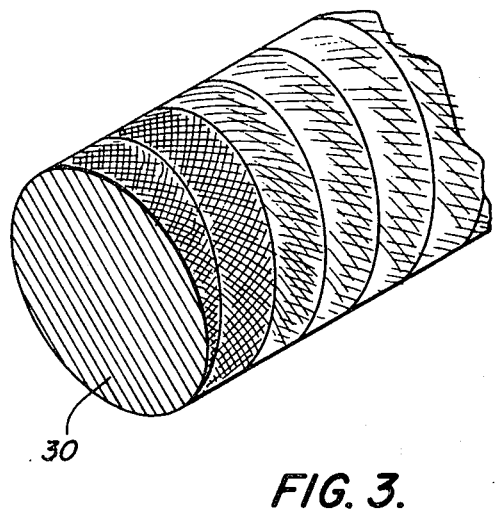
FIG. 3 is a fragmentary perspective, sectional view illustrating the method of forming a reinforcing structure for the preformed tire sections.
Figure 4:
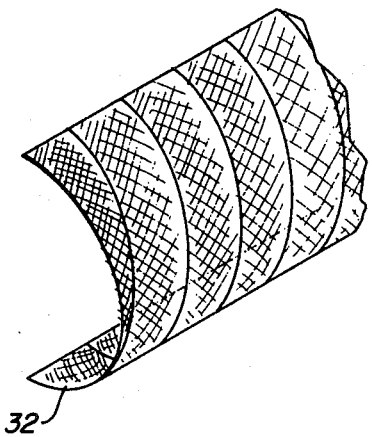
FIG. 4 is a perspective view of a portion of a fiber reinforcing structure produced by the method illustrated in FIG. 3.

The two reinforced tire sections can be assembled or built up by wrapping strips or webs of a woven reinforcing material impregnated and/or coated with an elastomer, around a toroidal mandrel 30 having a circular cross-section as shown in FIG. 3 and then cutting the reinforcing structure into two sections 32 as shown in FIG. 4, each having a semicircular cross section. The reinforcing webs or strips may be wound radially or spirally by machinery that is automatic in its operation. The mandrel about which the strips are wrapped, may be shaped to conform to the finished tire shape so that there will be little or no subsequent reforming of the preformed reinforcement structures. During this process, the reinforcing fabric may also be folded or wrapped around wire ring 16.

Figure 7:
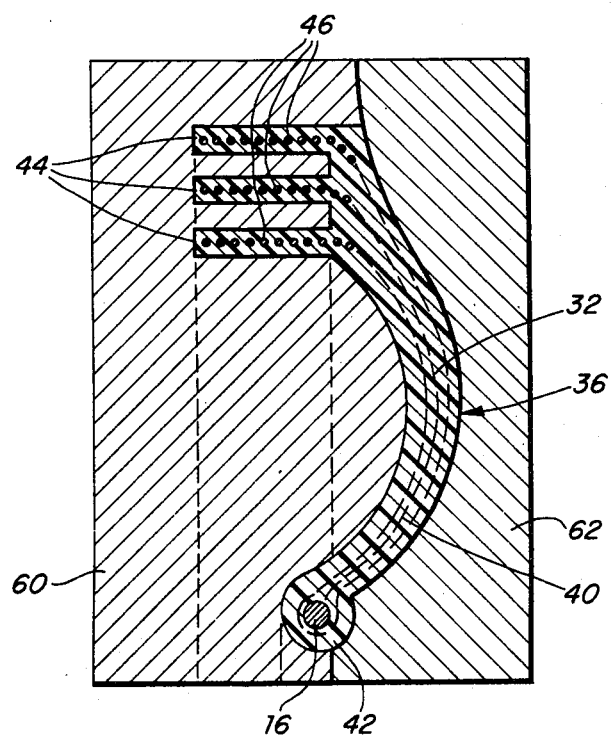
FIG. 7 is a sectional view showing the molding of a preformed tire section.

Each section 32 is then positioned in an appropriately shaped mold such as shown in FIG. 7 together with a ring 16, belts 32 and additional elastomer as required, to preform the tire section. A typical mold, illustrated in FIG. 7, comprises two sections designated 60 and 62 having a cavity with inner surfaces complementary to the desired, preformed tire section configuration. This preforming molding process includes the application of pressure to form the tire section and heat transfer to or from the elastomer to harden it, either by partial curing or by freezing, thereby maintaining the elastomer in at least partially curable condition, to facilitate handling and subsequent assembly operations. Partial curing by the application of heat and pressure is preferred.

The final assembly molding, and curing or vulcanizing operations are, for the most part, conventional differing from the usual practice primarily with regard to the partially cured reinforcing structures introduced into the mold. The two (or more) sections are positioned in the final mold, the bands are interleaved and the sections are subjected to heat and pressure to complete the curing or vulcanization of the elastomer while uniting the sections to form an integral unit. Immediately prior to or subsequent to assembling the tire sections in the final mold, additives such as curing agents and additional liquid elastomer may be added or applied to the sections to promote curing and bonding of the sections to one another.

Figure 5:
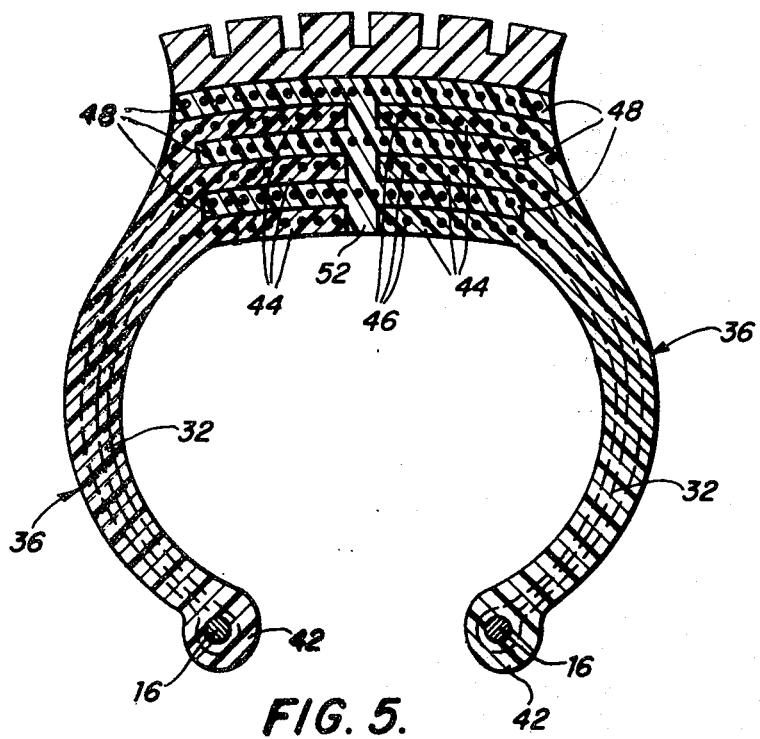
FIG. 5 is a sectional view of another embodiment of a tire formed by joining at least three preformed, reinforced sections.
Figure 6:
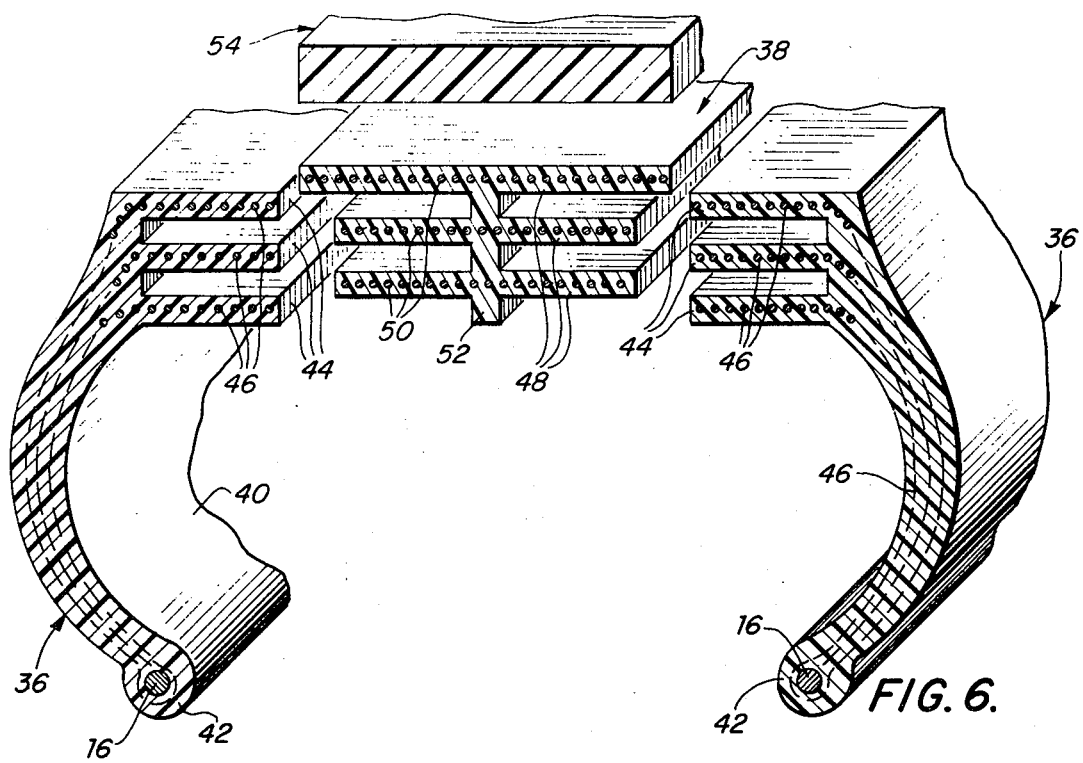
FIG. 6 is a fragmentary, sectional, perspective view illustrating the preformed sections of the tire of FIG. 5 and the method of assembly.

The construction and manufacture of a tire formed of three preformed reinforced sections are illustrated in FIGS. 5 and 6. The tire includes two substantially identical lateral sections designated 36 and a laterally symmetrical connecting section 38 joined to the lateral sections. Each of lateral sections 36 includes a side wall 40, a rim 42 in which is embedded a wire ring 16, and three radially spaced annular bands 44 having an axial dimension slightly less than half the tread width. Lateral sections 36 are formed in a mold as shown in FIG. 7, by positioning elastomer-impregnated, reinforcing sections 32 in the mold together with annular reinforcing belts 46, a ring 16 and additional elastomer as required and applying heat and pressure to partially cure the elastomer. Since sections 36 are identical, they can be formed in the same mold.

The connecting section 38 comprises three annular bands 48 each including an endless annular belt 50, slightly narrower than the tread with, embedded therein. Bands 48 are spaced radially by the thickness of bands 44 of lateral sections 36 and are connected to one another by a medial web 52 formed of the elastomer.

Lateral sections 36 and connecting section 38 are assembled together in a mold with bands 44 interleaved with bands 48 and heat and pressure are applied to the sections to cure or vulcanize the tire sections uniting them with one another. The structure thus formed is exceedingly strong and resistant to separation by virtue of the overlapping of the bands and belts embedded therein and the fact that the belts of the connecting section extend almost the full width of the annular tread section.

The tire shown in FIGS. 5 and 6 may be formed as four sections, the fourth section being an annular tread section 54 in which the treads are formed. Section 54 is initially fabricated as a separate ring of elastomer and is introduced into the mold during the final molding operation in which the tread section is joined to the peripheral outer surface of connecting section 38. Alternatively, the additional thickness or layer of elastomer in which the tread is formed may be formed as a layer on the outer band 48 of the connecting section during the preform molding of the connecting section.

As previously noted, the final molding operation is performed in the conventional manner employing well known tire molding techniques and equipment. The tire sections are assembled in a mold, usually formed of at least two sections, having a cavity with an inner surface corresponding to the desired outer surface configuration of the completed tire including the tread and any printing or indicia to be included on the sidewall surfaces. The mold includes an expandable core which may take the form of a toroidal-shaped bag adapted to be introduced into the tire in a collapsed condition and thereafter inflated to compress the preformed tire sections agains the walls of the mold cavity. The peripheral tread surface of the tire may be flat or crowned depending upon the shape of the mold cavity. To facilitate formation of a crowned tread surface, the tread section 52 may be formed with a concave peripheral surface which permits the interleaved bands to assume a convexly cured configuration in response to the application of outward pressure during the final molding operaton.

It will be seen from the foregoing that the novel tire manufacturing method of the invention involving the interleaving of annular reinforced portions of tire sections provides a stronger bond between the tire sections as well as a high strength tread supporting section joining the side walls of the tire; while the tire itself has the strength, integrity and durability heretofore impossible to achieve by assembling preformed sections to form a tire.

Since certain changes may be made in the above method and product without departing from the scope of the invention herein involved, it is intended that all matter contained in the above description or shown in the accompanying drawings shall be interpreted as illustrative and not in a limiting sense.

What is claimed is:

1. The method of manufacturing a pneumatic tire body having a general toroidal shape including side walls and an annular portion on which the tread can be formed, said method comprising the steps of:
    assembling elastomer impregnated reinforcing elements to form at least two separate preformed sections of a tire body, two of said sections including a reinforced side wall and plural radially-spaced reinforced annular bands adapted to be interleaved with one or more corresponding annular bands of another sections of said tire body to form the annular portion of said tire body;
    shaping and hardening the elastomer of said sections while keeping said elastomer in at least a partially curable condition;
    assembling shaped and hardened said sections in a mold and interleaving said annular bands of one of said section with corresponding annular bands of another of said sections; and
    applying heat and pressure to the tire sections in said mold to cure said elastomer and bond the interleaved annular bands to one another to form an integral tire body having side walls joined by an annular portion including overlapped, interleaved bands and reinforcing elements.

2. The method of claim 1 wherein said reinforcing elements include woven fabrics.

3. The method of claim 1 wherein said reinforcing elements are each assembled and compressed in a mold to form one of said sections.

4. The method of claim 1 wherein said annular reinforcing belt is embedded in said elastomer of each of said annular bands.

5. The method of claim 1 wherein said tire body is formed in at least three sections including two lateral sections each including a side wall and annular bands including reinforcing elements and a connecting section including a plurality of interconnected annular bands each including an annular reinforcing belt embedded in said elastomer, and said interconnected annular bands of said connecting section are interleaved with and bonded to said annular bands of said side sections to form said annular portion and an integral tire body.

6. The method of claim 5 including forming an annular tread section of elastomer, engaging and joining said tread section with an outer annular band of said connecting section and molding treads in said tread section.

7. The method of claim 5 wherein said side sections are formed in the same or substantially identical molds and said connecting section is laterally symmetrical.

8. The method of claim 7 wherein an annular reinforcing belt is embedded in said elastomer of each of said annular bands of said side sections.

9. The method of claim 1 wherein said tire body is formed in only two of said separate tire body sections each including a side wall and a plurality of annular bands, said annular bands of said two separate sections being interleaved with and bonded to one another to form said annular portion of said tire body on which the tread is formed.

10. The method of claim 9 wherein each of said two sections is formed by molding.

11. The method of claim 9 wherein an annular tread section is preformed of an elastomer and is engaged around and bonded to said annular portion and threads are formed in said tread section after said sections have been joined together.

12. The method of claim 9 wherein each of said separate tire body sections is formed with an outer annular portion including a relatively thick annular layer of an elastomer having an edge adapted to abut the edge of said annular layer of the other tire section and said edges are located in abutment and joined to one another during curing of said elastomer.

13. The method of claim 12 wherein said annular layer is formed in an outermost annular band.

14. The method of claim 12 wherein said edges are formed with mutually engagable indentations and projections.

* * * * *

UNITED STATES PATENT OFFICE
CERTIFICATE OF CORRECTION

PATENT NO. : 3,975,490

DATED : August 17, 1976

INVENTOR(S) : James M. Lapeyre

It is certified that error appears in the above-identified patent and that said Letters Patent are hereby corrected as shown below:

Column 5, line 58, "sections" should be corrected to read "section";

Column 6, line 50, "threads" should be corrected to read "treads".

Signed and Sealed this

Eighteenth Day of October 1977

[SEAL]

Attest:

RUTH C. MASON
Attesting Officer

LUTRELLE F. PARKER
Acting Commissioner of Patents and Trademarks